United States Patent
Choi

(10) Patent No.: US 8,085,559 B1
(45) Date of Patent: *Dec. 27, 2011

(54) CURRENT MODE CONTROL FOR RESONANT CONVERTER CIRCUITS

(75) Inventor: Hangseok Choi, Bedford, NH (US)

(73) Assignee: Fairchild Semiconductor Corporation, South Portland, ME (US)

(*) Notice: Subject to any disclaimer, the term of this patent is extended or adjusted under 35 U.S.C. 154(b) by 403 days.

This patent is subject to a terminal disclaimer.

(21) Appl. No.: 12/488,851

(22) Filed: Jun. 22, 2009

(51) Int. Cl.
*H02M 3/335* (2006.01)

(52) U.S. Cl. .................................. 363/21.02; 363/21.15

(58) Field of Classification Search ............... 363/21.02, 363/21.15
See application file for complete search history.

(56) References Cited

U.S. PATENT DOCUMENTS

| | | | | |
|---|---|---|---|---|
| 6,018,467 A * | 1/2000 | Majid et al. | ...................... | 363/16 |
| 6,087,782 A * | 7/2000 | Majid et al. | .................... | 315/224 |
| 7,466,753 B2 * | 12/2008 | Fink et al. | ...................... | 375/239 |
| 2009/0196074 A1 * | 8/2009 | Choi | .......................... | 363/21.02 |

OTHER PUBLICATIONS

Hangseok Choi, "Design Consideration for an LLC Resonant Converter", 2007, 9 sheets, Fairchild Semiconductor.
L6599 High-Voltage Resonant Controller, Apr. 2005, 17 sheets, STMicroelectronics.
Application Note An-4151—Half bridge LLC Resonant Converter Design Using FSFR-series Fairchild Power Switch (FPS), Oct. 2007, 17 sheets, Fairchild Semiconductor.

* cited by examiner

*Primary Examiner* — Jue Zhang
(74) *Attorney, Agent, or Firm* — Okamoto & Benedicto LLP

(57) ABSTRACT

A current mode resonant converter integrates current information from a first drive transistor to generate an integration signal. The integration signal is added to a sawtooth signal to generate a quasi-sawtooth signal. The quasi-sawtooth signal is compared to an error signal indicative of an output voltage of the resonant converter. The first drive transistor is switched OFF when the quasi-sawtooth signal reaches the level of the error signal. Once the first drive transistor is turned off, a second drive transistor is turned on for the same time duration same as the first drive transistor.

14 Claims, 5 Drawing Sheets

CURRENT MODE CONTROL FOR RESONANT CONVERTER CIRCUITS

BACKGROUND OF THE INVENTION

1. Field of the Invention

The present invention relates generally to electrical circuits, and more particularly but not exclusively to voltage regulators.

2. Description of the Background Art

A voltage regulator is an electrical circuit that converts an input voltage to a regulated output voltage. A resonant converter is a voltage regulator that uses a resonant LC circuit as part of the conversion process. Generally speaking, a drive transistor is used to apply energy to the resonant circuit. This allows energy to circulate in the resonant circuit, which is used to generate the output voltage. A resonant converter may be operated using current mode control. In current mode control, current through the drive transistor dictates when the drive transistor is switched OFF.

Embodiments of the present invention provide an improved current mode control for resonant converters.

SUMMARY

In one embodiment, a current mode resonant converter integrates current information from a first drive transistor to generate an integration signal. The integration signal is added to a sawtooth signal to generate a quasi-sawtooth signal. The quasi-sawtooth signal is compared to an error signal indicative of an output voltage of the resonant converter. The first drive transistor is switched OFF when the quasi-sawtooth signal reaches the level of the error signal. Once the first drive transistor is turned off, a second drive transistor is turned on for the same time duration same as the first drive transistor.

These and other features of the present invention will be readily apparent to persons of ordinary skill in the art upon reading the entirety of this disclosure, which includes the accompanying drawings and claims.

The use of the same reference label in different drawings indicates the same or like components.

DETAILED DESCRIPTION

In the present disclosure, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention. In the present disclosure, signals labeled with a "V" (e.g., $V_{ST}$) are voltage signals and signals labeled with an "I" (e.g., $I_{DS}$) are current signals.

Figure 1:
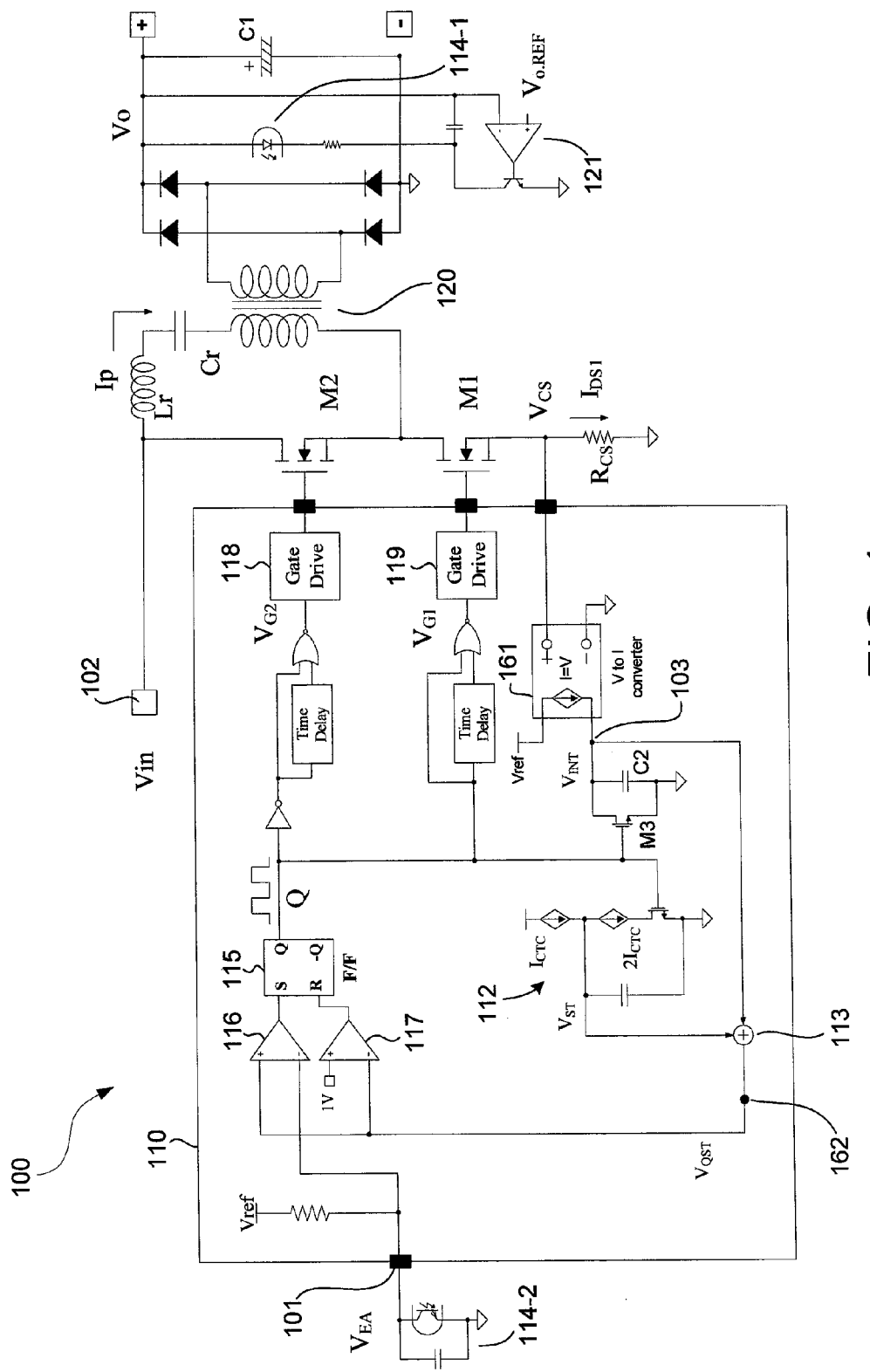
FIG. 1 schematically shows a current mode resonant converter in accordance with an embodiment of the present invention.

FIG. 1 schematically shows an electrical circuit in the form of a current mode half-bridge resonant converter 100 in accordance with an embodiment of the present invention. In the example of FIG. 1, the converter 100 includes a controller 110 configured to drive a pair of drive transistors M1 and M2 to generate a regulated DC output voltage $V_O$ across the capacitor C1. The two drive transistors M1 and M2 are driven in complementary manner, each with 50% duty cycle.

In one embodiment, the drive transistors M1 and M2 comprise metal-oxide semiconductor field effect transistors (MOSFET). The controller 110 may be implemented as an integrated circuit (IC), for example.

The converter 100 is a resonant converter in that it employs a resonant LC circuit comprising an inductor Lr and a capacitor Cr coupled to the primary side of the transformer 120. In the example of FIG. 1, the converter 100 has a full bridge rectifier circuit in the secondary side of the transformer 120. The rectifier circuit of the converter 100 may also be a half-bridge with center tapped winding in the secondary side without detracting from the merits of the present invention.

The controller 110 monitors the output voltage $V_O$ by way of an error amplifier 121. The error amplifier 121 compares the output voltage $V_O$ to a reference voltage $V_{O,REF}$ to generate an error voltage $V_{EA}$. The error voltage $V_{EA}$, which is indicative of the output voltage $V_O$, is coupled to a node 101 of the controller 110 by way of an optocoupler 114, comprising a transmitter 114-1 and a receiver 114-2.

The controller 110 complementarily drives the transistors M1 and M2. That is, the controller 110 drives the transistors M1 and M2 with 50% duty cycle each, such that the transistor M1 is switched OFF when the transistor M2 is switched ON, and the transistor M1 is switched ON when the transistor is switched OFF. The controller 110 is configured to drive the drive transistors M1 and M2 to have substantially same conduction time, which is important in a current mode resonant converter to guarantee stable operation. When the transistor M1 is switched ON, A DC input voltage Vin on a node 102 allows current flow through the inductor Lr, the capacitor Cr, the primary winding of the transformer 120, and the transistor M1. The current $I_P$ represents current through the primary winding of the transformer 120. The currents $I_P$ and $I_{DS1}$ are the same when the transistor M1 is switched ON.

The current $I_{DS1}$ through the transistor M1 develops a voltage on the resistor $R_{CS}$. The current $l_{DS}$ is indicative of the average of the output current delivered to a load (not shown) coupled to the output voltage $V_O$. A voltage to current converter 161 converts the voltage developed on the resistor $R_{CS}$ to current, which is integrated by a capacitor C2 to generate an integration signal $V_{INT}$ on a node 103. The output of the voltage to current converter 161 is indicative of the current $I_{DS1}$.

An oscillator 112 generates a triangular waveform, which in this case is a sawtooth signal $V_{ST}$. A summer 113 adds the sawtooth signal $V_{ST}$ to the integration signal $V_{INT}$ to generate a quasi-sawtooth signal $V_{QST}$ on a node 162. A comparator 116 compares the quasi-sawtooth signal $V_{QST}$ to the error voltage $V_{EA}$ present on the node 101. When the quasi-sawtooth signal $V_{QST}$ increases above the voltage level of the error voltage $V_{EA}$, the comparator 116 sets the SR flip-flop 115 to switch OFF the transistor M1 and switch ON the transistor M2. This turns OFF conduction through the transistor M1. The converter 100 operates in current mode control in that the transistor M1 is switched OFF when the current through the transistor M1 reaches a programmed level, which in this example is the error voltage $V_{EA}$.

Switching OFF the transistor M1 results in the quasi-sawtooth signal $V_{QST}$ to decrease. A comparator 117 compares the quasi-satooth signal $V_{QST}$ to a reference voltage, which is 1 volt in the example of FIG. 1. When the quasi-sawtooth signal decreases below 1 volt, the comparator 117 resets the SR flip-flop 115 to switch ON the transistor M1 and switch OFF the transistor M2. This turns ON conduction through the transistor M1 to start another control cycle. This advantageously allows the duty cycle of each transistor to be maintained at 50%, which is important to the stability of a resonant converter.

Figure 2:
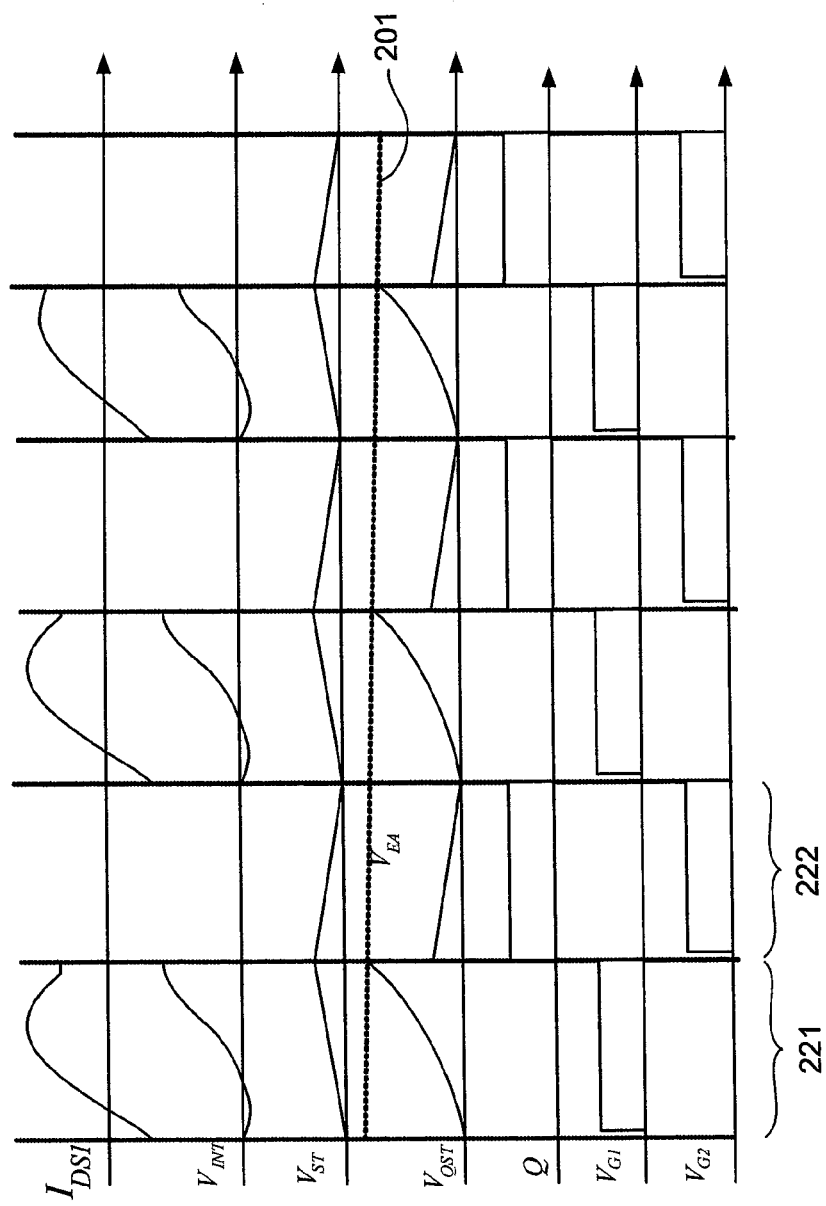
FIG. 2 shows an example timing diagram of signals in the resonant converter of FIG. 1.

FIG. 2 shows an example timing diagram of signals in the converter 100 of FIG. 1. The gate voltage $V_{G2}$ controls switching of the transistor M2 by way of the gate drive circuit 118. Similarly, the gate voltage $V_{G1}$ controls switching of the transistor M1 by way of the gate drive circuit 119. Time periods 221 and 222 show conduction time for transistor M1 and M2, respectively, each of which has 50% duty cycle.

The time period 221 shows the first half of the control cycle. In the first half of a control cycle, the gate voltage $V_{G1}$ is active (logical HIGH in this example) to switch ON the transistor M1. The transistor M2 is switched OFF at this time. The resulting current $I_{DS1}$ through the transistor M1, the integration signal $V_{INT}$, and the sawtooth signal $V_{ST}$ are shown for the first half of the control cycle. The sawtooth signal $V_{ST}$ ramps up during the first half of the control cycle, resulting in the quasi-sawtooth signal $V_{AST}$ to also increase until it reaches the same voltage level as the error voltage $V_{EA}$ (see waveform 201). This inactivates (logical LOW in this example) the gate voltage $V_{G1}$ and activates the gate voltage $V_{G2}$ in a following second half of the control cycle. For each switching cycle, the duration the gate voltage $V_{G1}$ is active is kept substantially the same as the duration the gate voltage $V_{G2}$ is active to maintain 50% duty cycle for each transistor. Note the time delay between activation of the gate voltages $V_{G1}$ and $V_{G2}$ to prevent both transistors M1 and M2 from conducting at the same time.

The time period 222 shows the second half of the control cycle. In the second half of the control cycle, the gate voltage $V_{G2}$ is active to switch ON the transistor M2. The transistor M1 is switched OFF at this time. The sawtooth signal $V_{ST}$ ramps down during the second half of the control cycle. Together with no conduction through the transistor M1, this causes the quasi-sawtooth signal $V_{QST}$ to decrease. Another control cycle is started once the quasi-sawtooth signal $V_{QST}$ decreases to a programmed level, which is 1 volt in the example of FIG. 1 (see comparator 117 in FIG. 1).

Figure 3:
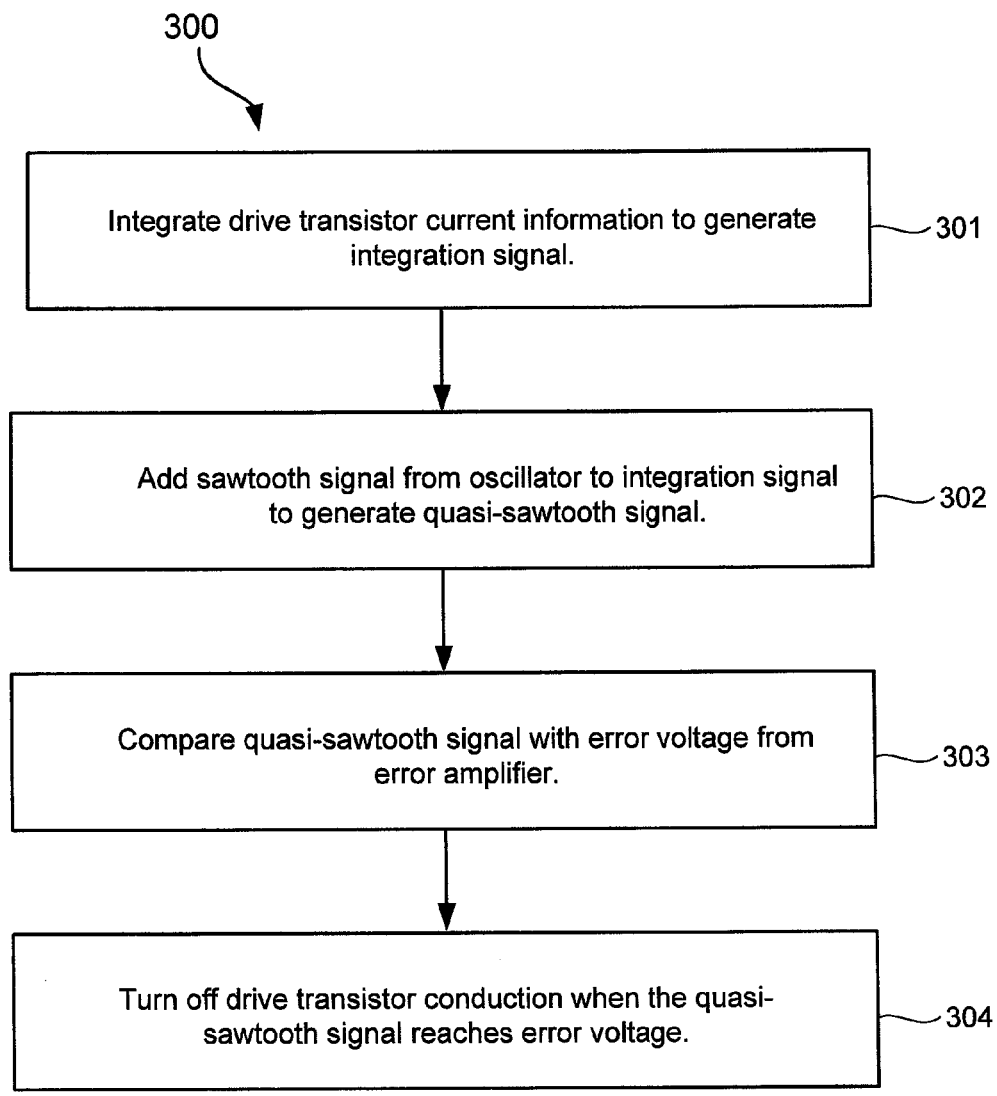
FIG. 3 shows a flow diagram of a method of operation of a current mode resonant converter in accordance with an embodiment of the present invention.

FIG. 3 shows a flow diagram of a method 300 of operation of a current mode resonant converter in accordance with an embodiment of the present invention. The method 300 is explained using the resonant converter 100 of FIG. 1 for illustration purposes.

In step 301, current information flowing through the drive transistor M1 is integrated to generate an integration signal $V_{INT}$. In the example of FIG. 1, the current information is indicative of the current $I_{DS1}$.

In step 302, sawtooth signal from the converter's oscillator is added to the integration signal $V_{INT}$ to generate a quasi-sawtooth signal $V_{QST}$.

In step 303, the quasi-sawtooth signal $V_{QST}$ is compared to the error voltage $V_{EA}$ of the converter's error amplifier.

In step 304, conduction through the drive transistor M1 is switched OFF when the quasi-sawtooth signal $V_{QST}$ reaches the voltage level of the error voltage V.

As can be appreciated from the foregoing, embodiments of the present invention provide advantages heretofore unrealized in current mode resonant converters. First, embodiments of the present invention allow the control-to-output transfer function of the resonant converter power stage to become a first order system, making the feedback compensation design easier relative to other circuit configurations. Second, the control bandwidth of the converter can be extended for better transient response. Third, pulse-by-pulse power/current limit can be achieved by limiting the error amplifier output voltage with a clamping circuit (e.g., zener diode) on the error voltage $V_{EA}$.

Figure 4:
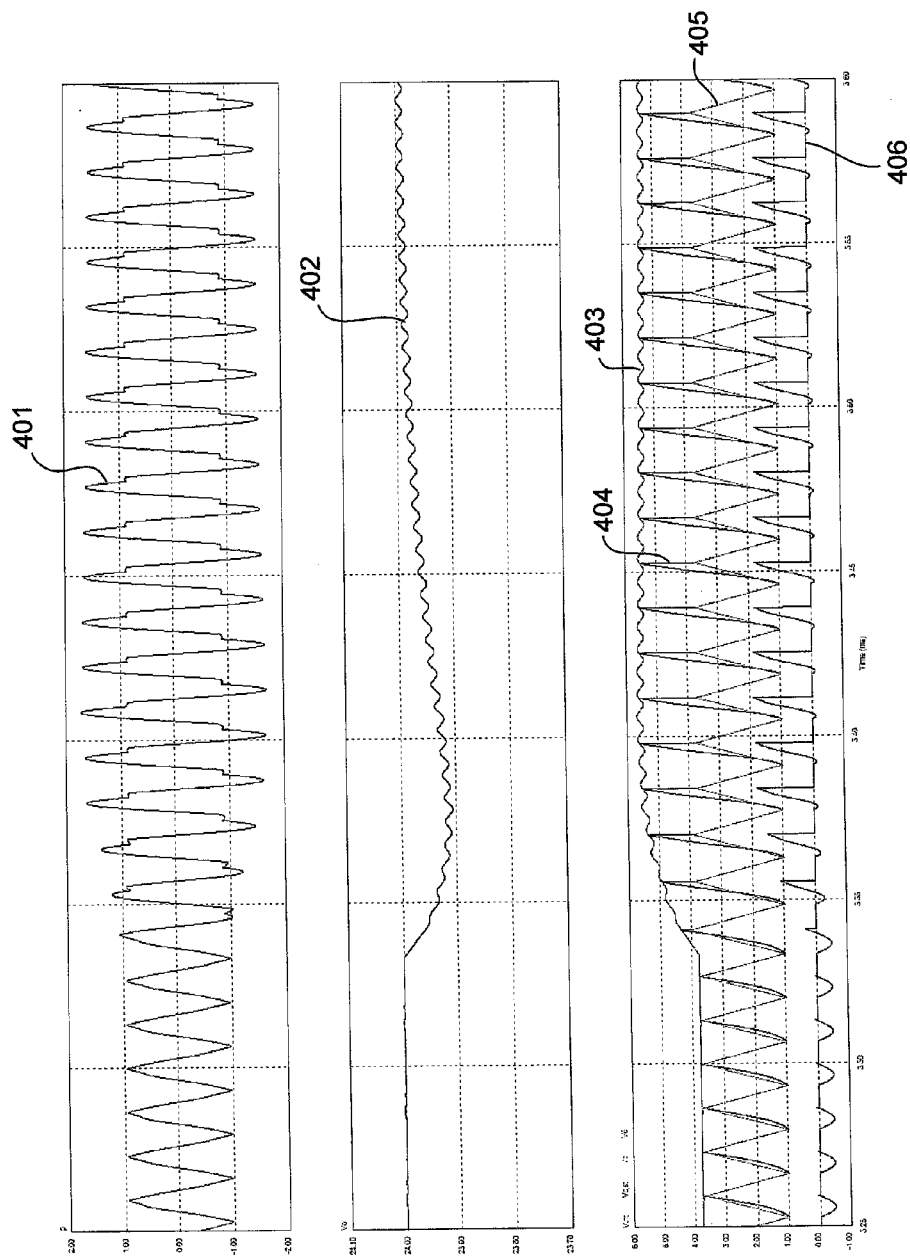
FIG. 4 shows example waveforms of signals in the resonant converter of FIG. 1.

FIG. 4 shows example load transient waveforms of signals in the converter 100 of FIG. 1. In the example of FIG. 4, the waveform 401 shows the current $I_P$ through the primary side of the transformer 120, waveform 402 shows the output voltage $V_O$ (in this example, dipping from 24V to 23.9V), the waveform 403 shows the error voltage $V_{EA}$, the waveform 404 shows the quasi-sawtooth signal $V_{QST}$, the waveform 405 shows the sawtooth signal $V_{ST}$, and the waveform 406 shows the integration signal $V_{INT}$. Notice the relatively fast transient and smooth response of the output voltage $V_O$ (waveform 402). Furthermore, the current overshoot during load transient is relatively small, minimizing the current stress of switching devices.

Figure 5:
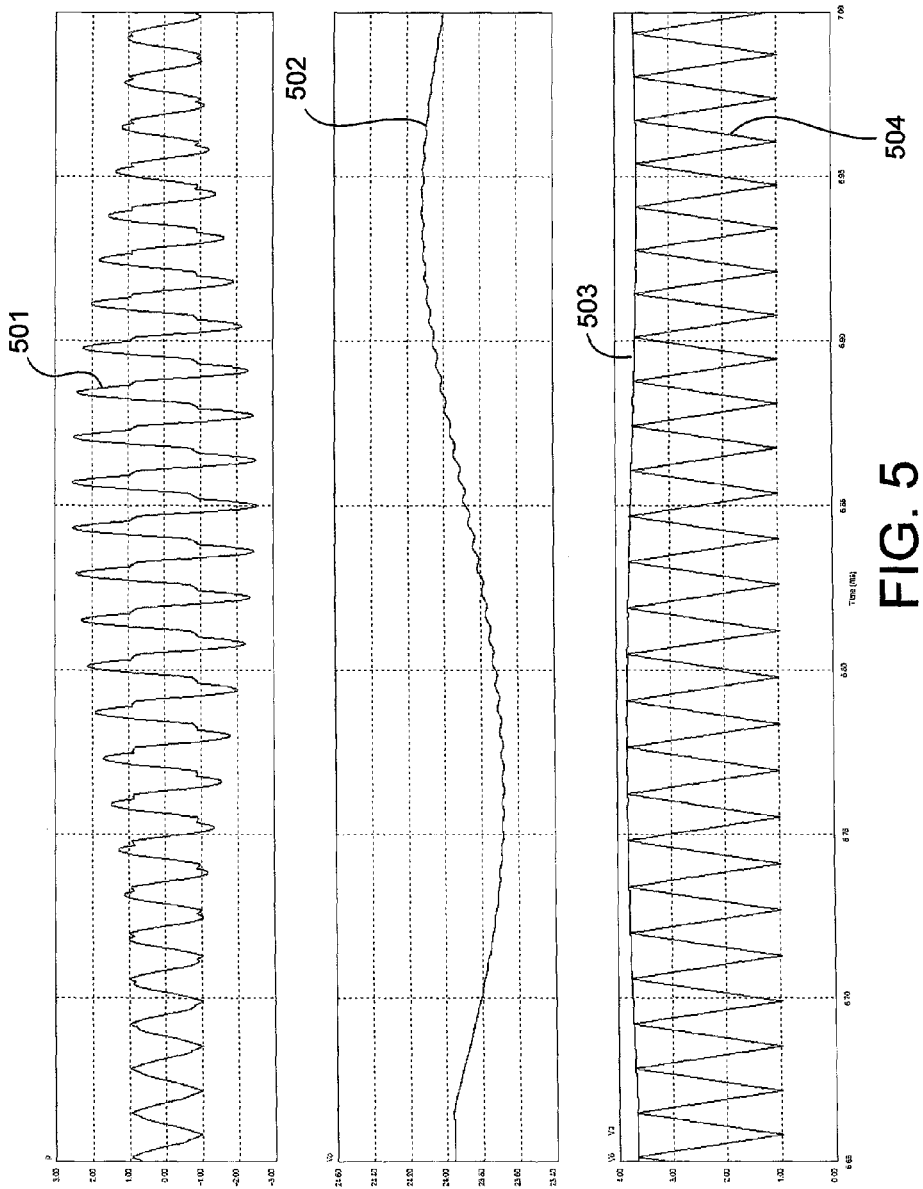
FIG. 5 shows example waveforms of a conventional resonant converter.

For comparison, FIG. 5 shows example load transient waveforms of a conventional resonant converter. In FIG. 5, the waveform 501 shows current through the primary side of the transformer, the waveform 502 shows the output voltage (in this example, dipping from 24V to 23.7V), the waveform 503 shows the error voltage, and the waveform 504 shows the sawtooth signal. Notice the relatively slow transient response of the output voltage (waveform 502) compared to that of the converter 100. Comparing FIGS. 4 and 5, it can be seen that there is more overshoot in the conventional resonant converter.

An improved current mode resonant converter and associated method of operation have been disclosed. While specific embodiments of the present invention have been provided, it is to be understood that these embodiments are for illustration purposes and not limiting. Many additional embodiments will be apparent to persons of ordinary skill in the art reading this disclosure.

What is claimed is:

1. A resonant converter circuit configured to convert an input voltage to an output voltage, the resonant converter circuit comprising:
   an LC resonant circuit configured to receive the input voltage;
   a first drive transistor and a second drive transistor on a primary side of a transformer;
   an error amplifier configured to generate an error voltage indicative of a level of the output voltage;
   an integrator configured to generate an integration signal by integrating another signal indicative of current flowing through the first drive transistor when the first drive transistor is switched ON;
   a summer configured to generate a quasi-sawtooth signal by adding the integration signal to a sawtooth signal; and
   a control circuit configured to switch OFF the first drive transistor when the quasi-sawtooth signal increases to a level of the error voltage, wherein once the first drive transistor is switched OFF, the control circuit switches ON the second drive transistor such that the first and second drive transistors each has a duty cycle of 50%.

2. The resonant converter circuit of claim 1 wherein the control circuit is an integrated circuit that includes the oscillator and the summer.

3. The resonant converter circuit of claim 1 wherein the control circuit comprises:

a comparator configured to compare the quasi-sawtooth signal to the error voltage;

a flip-flop configured to receive an output of the comparator; and a gate drive circuit configured to switch OFF the first drive transistor when the output of the comparator indicates that the quasi-sawtooth signal reaches a voltage level of the error voltage.

4. The resonant converter circuit of claim 3 further comprising an opto-isolator configured to couple the error voltage to an input of the comparator.

5. The resonant converter circuit of claim 1 wherein the output voltage is developed across an output capacitor.

6. The resonant converter circuit of claim 1 wherein the first and second drive transistors each comprises a MOSFET.

7. A method of operation of a resonant converter circuit, the method comprising:

integrating current information from a first drive transistor of the resonant converter circuit to generate an integration signal, the first drive transistor being configured to be switched ON and OFF to convert an input voltage to a regulated output voltage;

adding the integration signal to a sawtooth signal to generate a quasi-sawtooth signal;

comparing the quasi-sawtooth signal to an error signal indicative of the output voltage; and switching OFF conduction of the first drive transistor when the quasi-sawtooth signal reaches a same level as the error signal; and switching ON a second drive transistor when the first drive transistor is switched OFF such that a conduction time of the second drive transistor is same as that of first drive transistor.

8. The method of claim 7 wherein the error signal comprises an error voltage generated by an error amplifier by comparing the output voltage to a reference voltage.

9. The method of claim 7 wherein the first and second drive transistors each comprises a MOSFET.

10. The method of claim 7 wherein the current information is indicative of current flowing through the first drive transistor, an LC resonant circuit, and a primary side of a transformer when the first drive transistor is turned ON.

11. A voltage regulator circuit comprising:

first and second drive transistors configured to be switched ON and OFF to convert an input voltage to a regulated output voltage, the second drive transistor being configured to be switched ON when the first drive transistor is switched OFF to maintain a conduction time that is same as that of first drive transistor;

a first circuit configured to generate an error signal indicative of the output voltage;

a second circuit configured to generate an integration signal by integrating another signal indicative of current flowing through the first drive transistor when the first drive transistor is switched ON;

a third circuit configured to generate a quasi-sawtooth signal by adding the integration signal to a sawtooth signal; and a fourth circuit configured to switch OFF the first drive transistor when the quasi-sawtooth signal reaches a level of the error signal.

12. The circuit of claim 11 wherein the first circuit comprises an error amplifier and the error signal comprises an error voltage.

13. The circuit of claim 11 further comprising a voltage to current converter configured to generate the other signal by converting to current a voltage developed across a resistor by the current flowing through the drive transistor when the first drive transistor is switched ON.

14. The circuit of claim 11 wherein the first and second drive transistors each comprises a MOSFET.

* * * * *